United States Patent [19]
Cutler

[11] Patent Number: 5,888,035
[45] Date of Patent: Mar. 30, 1999

[54] SYSTEM FOR INSTALLING A LENGTH OF CABLE WITHIN A WALL

[76] Inventor: Terry B. Cutler, 1600 N. SanFernando Blvd. #320, Burbank, Calif. 91504

[21] Appl. No.: 925,659

[22] Filed: Sep. 9, 1997

[51] Int. Cl.⁶ .................................................. B23B 51/08
[52] U.S. Cl. ................ 408/225; 408/226; 254/134.3 FT
[58] Field of Search .................................... 408/1 R, 204, 408/206, 207, 209, 224, 225, 226, 303; 254/134.3 FT

[56] References Cited

U.S. PATENT DOCUMENTS

| | | | |
|---|---|---|---|
| 4,413,937 | 11/1983 | Gutsche | 408/239 |
| 5,310,294 | 5/1994 | Perkins | 408/226 |
| 5,529,443 | 6/1996 | Flener | 408/226 |
| 5,785,468 | 7/1998 | Peritz | 408/226 |

*Primary Examiner*—Daniel W. Howell
*Assistant Examiner*—Monica Smith

[57] ABSTRACT

The present invention relates to a system for installing a length of cable through a wall. Thus, the system of the present invention can be used to route a television, telephone or computer cable through an existing wall. The system employs an electric drill and associated drill bit. Over the drill bit a routing tool is adapted to be fitted into and secured to the drill chuck of the drill. In use, both the drill bit and tool are secured to the drill. In the preferred embodiment, the drill bit is long enough to extend beyond the end of the tool. Next, the drill is used to cut a hole into a wall. Once through the wall the drill bit can be removed from the tool and the tool can be left within the wall. Any type of cable can now be positioned through the tool within the wall. Lastly, the routing tool can be removed from the other side of the wall and used again elsewhere.

7 Claims, 2 Drawing Sheets

SYSTEM FOR INSTALLING A LENGTH OF CABLE WITHIN A WALL

BACKGROUND OF THE INVENTION

1. Field of the Invention

The present invention relates to a system for installing a length of cable through a wall and more particularly pertains to such a system which employs an electric drill.

2. Description of the Prior Art

The use of a drill bits is known in the prior art. More specifically, drill bits are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,096,341 to Despres illustrates a hole saw and drive. U.S. Pat. No. 5,447,400 to Seymour discloses a wall penetrator fitting. U.S. Pat. No. 4,760,643 to Juma discloses a hole saw apparatus. U.S. Pat. No. 3,880,546 to Segal discloses a hole saw assembly. U.S. Pat. No. 4,072,441 to LaPointe discloses a hole saw apparatus. Lastly, U.S. Design Pat. Nos. 300,404 to Lauer and 303,118 to Cox disclose hole saw designs.

In this respect, the system of the present invention substantially departs from the conventional concepts and designs of the prior art, and in so doing provides an apparatus primarily developed for the purpose of installing a length of television, telephone or computer cable through a wall.

Therefore, it can be appreciated that there exists a continuing need for improved methods of installing computer cables and the like. In this regard, the present invention substantially fulfills this need.

SUMMARY OF THE INVENTION

In view of the foregoing disadvantages inherent in the known types of drill bits now present in the prior art, the present invention provides an convenient and easy way to install a length of cable. As such, the general purpose of the present invention, which will be described subsequently in greater detail, is to enable one person to easily install a length of cable within a wall.

To attain this, the present invention essentially comprises a system for installing a length of cable through a wall. Thus, the system of the present invention can be used to route a television, telephone or computer cable through an existing wall. The system employs an electric drill and associated drill bit. Over the drill bit a routing tool is adapted to be fitted into and secured to the drill chuck of the drill. In use, both the drill bit and tool are secured to the drill. In the preferred embodiment, the drill bit is long enough to extend beyond the end of the tool. Next, the drill is used to cut a hole into a wall. Once accomplished, the tool is released from the drill bit. At this point, only the tool remains in the wall. The length of cable can then be inserted through both the wall and the tool.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a system for installing a length of cable through a wall. The system employs an electric drill. The includes a drill chuck at its forward extent and a handle at its rearward extent. The drill is adapted to drive the chuck in either a clockwise or anti-clockwise sense. A tubular routing tool is adapted to be secured to the drill. The tubular routing tool is defined by a diameter, a first end, a second end and an intermediate extent therebetween. The routing tool being formed from steel and has an overall length of 10.5 inches. A series of three tangs are formed about the first end of the tool, with each of the tangs having a length of 0.5 inch. The series of tangs are removably secured within the drill chuck of the drill. A series of eight cut teeth are formed at the second end of the tool. Each of these cut teeth has a lower base end, an upper pointed end, and a length of 0.25 inches. Thus, the length of the cut teeth are half of the length of the tangs. The cut teeth functions to cut a hole equal to the diameter of the tool into a wall. The tool having an inside diameter of at least 0.375 inches. Additionally, a drill bit is employed which has a length greater than the length of the tool and is adapted to be secured to the drill bit along with the tool such that the drill bit extents within the inside diameter of the tool.

It is another object of the present invention to provide a simple system for installing a length of cable in a wall.

It is a further object of the present invention to provide a system which enables both a routing tool and a drill bit to be installed upon an electric drill.

An even further object of the present invention is to provide an installing system which is susceptible of a low cost of manufacture with regard to both materials and labor, and which accordingly is then susceptible of low prices of sale to the consuming public, thereby making such installing systems economically available to the buying public.

Still yet another object of the present invention is to provide a system for installing a length of cable which provides in the apparatuses and methods of the prior art some of the advantages thereof, while simultaneously overcoming some of the disadvantages normally associated therewith.

Still another object of the present invention is to enable a single user to efficiently install a length of cable within a wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

The present invention relates to a system for installing a length of cable through a wall. Thus, the system of the present invention can be used to route a television, telephone or computer cable through an existing wall. The system employs an electric drill and associated drill bit. Over the drill bit a routing tool is adapted to be fitted into and secured to the drill chuck of the drill. In use, both the drill bit and tool are secured to the drill. In the preferred embodiment, the drill bit is long enough to extend beyond the end of the tool. Next, the drill is used to cut a hole into a wall. Once accomplished, the tool is released from the drill bit. At this point, only the tool remains in the wall. The length of cable can then be inserted through both the wall and the tool. The various components of the present invention, and the manner in which they interrelate, will be described in greater detail hereinafter.

Figure 1:
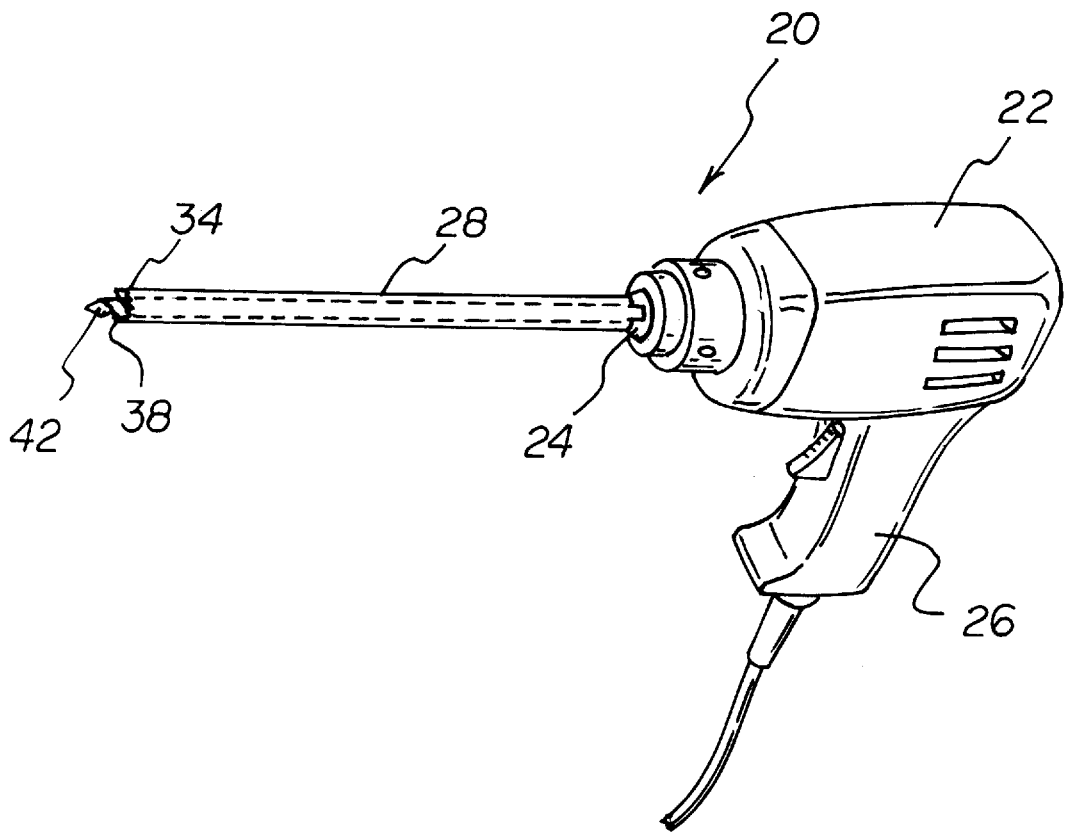
FIG. 1 is a perspective view of the tool secured to a drill.
Figure 2:
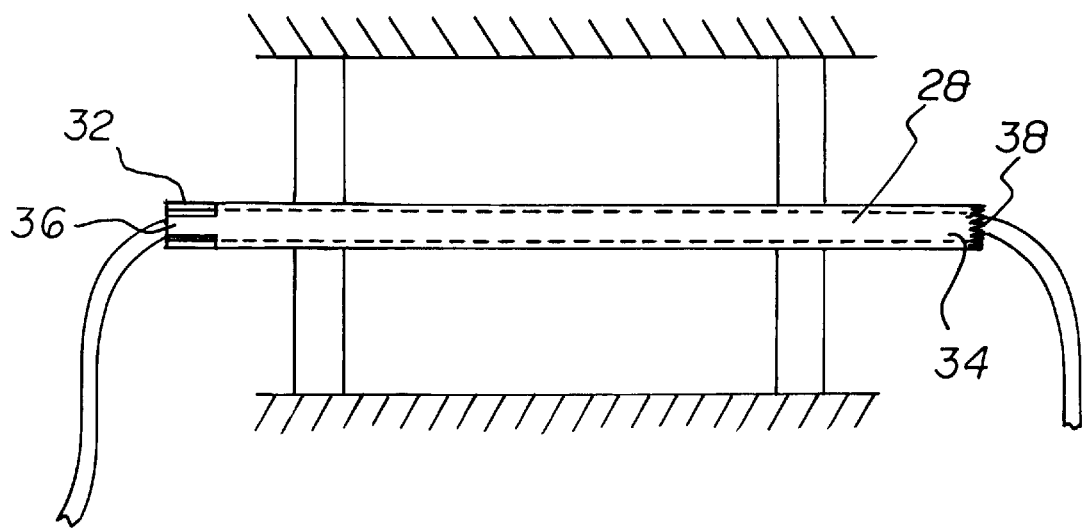
FIG. 2 is a view of the routing tool secured within a wall.

As illustrated in FIG. 1, the system 20 of the present invention employs an electric drill 22. This drill 22 includes a drill chuck 24 at its forward extent. In the preferred embodiment this is a jacobs type drill chuck. As is conventional, a handle 26 is formed at the rearward extent of the drill 22. The drill 22 includes a motor which is adapted to selectively drive the chuck 24 in either a clockwise or anti-clockwise sense.

Figure 3:
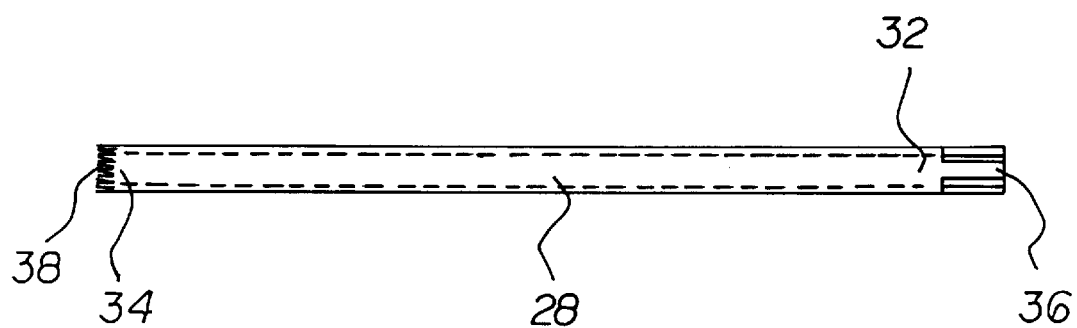
FIG. 3 is view of the tool detached from the drill or wall.

The routing tool 28 of the system is illustrated in FIG. 3. This tool 28, in the preferred embodiment, is tubular with a circular cross section. Additionally, the routing tool 28 is defined by a diameter, an inside diameter, a first end 32, a second end 34 and an intermediate extent therebetween. In the preferred embodiment the routing tool 28 is formed from steel such as a 1018 or 1020 mild carbon fiber steel. The overall length of the tool is 10.5 inches. This tool 28 length enables the tool 28 to be used upon most types of wall. With continuing reference to FIG. 3, a series of three tangs 36 are formed about the first end 32 of the tool 28. In the preferred embodiment there are three such tangs 36 so formed with each having a length of 0.5 inch. This preferred tang geometry enables the series of tangs 36 to be removably secured within the chuck 24 of the drill 22. At the opposite, second side 34, of the tool 28 a series of eight cut teeth 38 are formed. Each of these cut teeth 38, in the preferred embodiment, have a lower base end, an upper pointed end, and a length of 0.25 inches. Thus, as is apparent from FIG. 3, the length of the cut teeth 38 is half the length of the tangs 36. This ratio is preferable for providing a secure attachment to the drill at the first end 32 and sufficient cutting teeth 38 at the second end 34. The function of the cut teeth 38 is to cut a hole into a wall equal to the diameter of the tool 28. In the preferred embodiment the tool 28 has an inside diameter of 0.375 inches. The system, however, to be versatile must be employed with a tool 28 having an inside diameter of at least 0.320 inches. Additionally, in preferred embodiment the wall thickness of the tool is 0.030 inches.

The system also incorporates a drill bit 42. More specifically, a drill bit 42, having a length greater than the length of the tool 28, is adapted to be secured to the drill chuck 24. In use, the drill bit 42 and the routing tool 28 are both secured to the drill chuck 24. In this manner, the drill bit 42 extents within the inside diameter of the tool 28 with the bit 42 extending a slight distance beyond the length of the tool 28. Thus, when a user first beings to drill into a wall the drill bit 42 first drills a hole of a decreased diameter. Then, the tool 28 will come into engagement with the wall, thereby making a hole of increased diameter. Once through the wall the drill bit 42 can be removed from tool 28 and tool 28 can be left within the wall. Any type of cable can now be positioned through the tool 28 within the wall. Lastly, the routing tool 28 can be removed from the other side of the wall and used again elsewhere.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for installing a length of cable through a wall, the system comprising in combination:

an electric drill having a drill chuck at the forward extent of the drill and a handle at the rearward extent of the drill, the drill adapted to drive the chuck in either a clockwise or anti-clockwise sense;

a tubular routing tool having a diameter, a first end, a second end and an intermediate extent therebetween, the routing tool being formed from steel and having an overall length of 10.5 inches, a series of three tangs formed about the first end of the tool, each of the tangs having a length of 0.5 inch, the series of tangs removably secured within the drill chuck of the drill, a series of eight cut teeth at the second end of the tool, each of the cut teeth having a lower base end, an upper pointed end, and a length of 0.25 inches, thus the length of the cut teeth being half the length of the tangs, the cut teeth functioning to cut a hole equal to the diameter of the tool, the tool having an inside diameter of at least 0.375 inches;

a drill bit having a length greater than the length of the tool and adapted to be secured to the drill bit along with the tool such that the drill bit extents within the inside diameter of the tool.

2. A system for installing a length of cable through a wall, the system comprising in combination:

an electric drill having a drill chuck at the forward extent of the drill and a handle at the rearward extent of the drill, the drill adapted to drive the chuck in either a clockwise or anti-clockwise sense;

a tubular routing tool having a diameter, a first end, a second end and an intermediate extent therebetween, a series of tangs formed about the first end of the tool, the series of tangs removably secured within the drill chuck of the drill, a series of cut teeth at the second end of the tool, each of the cut teeth having a lower base end, an upper pointed end, the cut teeth functioning to cut a hole equal to the diameter of the tool;

a drill bit adapted to be secured to the drill bit along with the tool such that the drill bit extents within the inside diameter of the tool.

3. The system for installing a length of cable through a wall as described in claim 2 wherein:

tool is formed from steel and has an overall length of 10.5 inches.

4. The system for installing a length of cable through a wall as described in claim 2 wherein;

there are three tangs at the first end of the tool, and each of the tangs has a length of 0.5 inches.

5. The system for installing a length of cable through a wall as described in claim 2 wherein:

there are eight cut teeth at the second end of the tool, and each of the cut teeth having a length of 0.25 inches.

6. The system for installing a length of cable through a wall as described in claim 2 wherein:

the length of the cut teeth being half of the length of the tangs.

7. The system for installing a length of cable through a wall as described in claim 2 wherein:

the drill bit has a length greater then the length of the tool.

\* \* \* \* \*